United States Patent
Sokei et al.

(10) Patent No.: US 8,131,289 B2
(45) Date of Patent: Mar. 6, 2012

(54) MOBILE COMMUNICATION TERMINAL AND MOBILE COMMUNICATION CONTROL METHOD

(75) Inventors: Yoshimi Sokei, Meguro-ku (JP); Hiroaki Yamagishi, Yokohama (JP); Hideyuki Sakuramoto, Yokosuka (JP); Takehiro Ida, Yokosuka (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 361 days.

(21) Appl. No.: 12/480,446

(22) Filed: Jun. 8, 2009

(65) Prior Publication Data

US 2009/0305692 A1 Dec. 10, 2009

(30) Foreign Application Priority Data

Jun. 9, 2008 (JP) ................. 2008-150787

(51) Int. Cl.
*H04W 4/00* (2009.01)
(52) U.S. Cl. .................. 455/432.1; 455/434
(58) Field of Classification Search .......... 455/433, 455/450, 432.3, 435.2, 461, 459, 434
See application file for complete search history.

(56) References Cited

U.S. PATENT DOCUMENTS

| 7,962,135 B2 * | 6/2011 | Cooper ............... 455/432.1 |
| 2006/0009216 A1 | 1/2006 | Welnick et al. | |

FOREIGN PATENT DOCUMENTS

| CN | 1981547 A | 6/2007 |
| JP | 2002-027522 | 1/2002 |

OTHER PUBLICATIONS

Chinese Office Action, dated Nov. 21, 2011, 5 pages.

* cited by examiner

*Primary Examiner* — Tu X Nguyen
(74) *Attorney, Agent, or Firm* — Crowell & Moring LLP

(57) ABSTRACT

A mobile communication terminal holds a frequency cancellation list that is information related to cells that cannot be connected, and controls execution/non-execution (frequency cancellation) of the cell search according to the content of the cancellation list. In a case where a frequency is not assigned in a unified manner (when a frequency is assigned to different communication providers in some cells), a frequency cancellation time is set shorter than a case where the frequency is assigned in a unified manner. For example, a frequency f3 is rejected in a cell represented by "another" surrounded by a broken line when the mobile communication terminal moves from an area A to an area B. When the mobile communication terminal further moves to an area C, the frequency cancellation process initiated in the area B terminates. This is because a short frequency cancellation time is set. Therefore, the frequency cancellation time expires while the mobile communication terminal is moving from the area B to the area C. The frequency cancellation terminates, so as to be connectable in the area C of the frequency f3.

2 Claims, 6 Drawing Sheets

| FREQUENCY IDENTIFICATION (FID) | FREQUENCY CANCELLATION TIME |
|---|---|
| 35 | 20min |
| 65 | 10min |
| 68 | 10min |
| . | . |
| . | . |
| . | . |

MOBILE COMMUNICATION TERMINAL AND MOBILE COMMUNICATION CONTROL METHOD

BACKGROUND OF THE INVENTION

1. Field of the Invention

The present invention relates to a mobile communication terminal and a mobile communication control method, and particularly, to a mobile communication terminal and a mobile communication control method for use in a mobile communication system.

2. Description of the Related Art

A mobile communication terminal such as a cellular phone device executes a PLMN (Public Land Mobile Network) selection to search for a cell available in a mobile communication network when the power is turned on or when the terminal is out of the range of a cell. A description will be given of an operation for the PLMN selection executed by a mobile communication terminal.

An operation of searching for a mobile communication network is mainly categorized into the following three stages.

In the first stage, the mobile communication terminal detects the presence of a mobile communication network by measuring a reception level or the like of a radio signal transmitted with a certain power from a base transceiver station of the mobile communication network for an RAT (Radio Access Technology) supported by the mobile communication terminal or the frequency.

In the second stage, the mobile communication terminal receives notice information broadcasted from the mobile communication network detected in the first stage to acquire a Mobile Country Code (MCC) included in the notice information and a Mobile Network Code (MNC) indicating a mobile communication provider, thereby recognizing the type of mobile communication network to select the PLMN with the highest priority.

In the third stage, after selecting the mobile communication network with the highest priority, the mobile communication terminal further acquires, from the notice information, other information, such as adjacent cell information, which is necessary for receiving services. The mobile communication terminal performs a location registration with respect to the cell, if necessary. The mobile communication terminal is capable of receiving services from the mobile communication network when the mobile communication network approves a location registration request from the mobile communication terminal.

Frequency support is optional in the 3GPP (3rd Generation Partnership Project) specifications. Therefore, communication services for a specific frequency are not provided by a communication provider that does not support the frequency, or in an area where the use of a certain frequency is not approved even if the communication provider supports the frequency. Furthermore, in some areas, another communication provider operates at the frequency identical to that of a certain area.

According to the 3GPP specifications at present, cancellation is performed in the unit of frequency, if location registration fails for a specific reason in the network operation. Such a cancellation is called frequency cancellation or making the frequency unavailable. The frequency cancellation is, for example, the removal of the frequency or for a certain period of time from targets of the PLMN selection or cell selection so that an unnecessary PLMN selection or cell selection is not performed in the frequency when the location registration failed, because the location registration was performed for a non-contract provider. That is, a frequency cancellation process of ignoring a specific frequency in the radio waves included in a cell is executed during the certain period of time. This certain period of time is referred to as frequency cancellation time. This period of time is common to all frequencies, in other words, the same period of time is set.

The cell selection is an action of searching for and waiting for a cell of the selected PLMN, while the mobile communication terminal is moving from the range of a cell. The PLMN selection operation starts if a cell cannot be found in the cell selection.

A technique for selecting an optimal base transceiver station based on a cell selection table is described in Japanese Patent Application No. 2002-27522.

No problem will occur, if individual frequencies are assigned to the providers for providing communication services to mobile communication terminals. That is to say, no problem will occur, if the frequencies are assigned to adjacent cells in a unified manner, in the unit of frequency. However, a problem will occur, if providers are different in adjacent cells with respect to the identical frequency.

For example, after the mobile communication terminal has transmitted the location registration request to the network, the fact that the cell cannot be connected is recognized when the location registration request is rejected. Therefore, an unnecessary location registration request is transmitted, so the battery as a power source of the mobile communication terminal is consumed, and a radio resource is also consumed for the unnecessary request. Subsequently, the frequency is rejected for a certain frequency cancellation time. In this case, since the frequency cancellation time is set to a common value to all frequencies in a conventional mobile communication terminal, the efficiency of the frequency cancellation is poor when the mobile communication terminal moves around areas where the frequencies are not assigned to providers in a unified manner. That is, in a case where the frequency cancellation time is set long, there is a problem in that the frequency is rejected when the mobile communication terminal returns the area of a cell with the frequency of a contract provider even if the connection is available. These problems will be described with reference to FIGS. 10 and 11.

FIG. 10 shows an example of a frequency cancellation process when the frequencies are assigned to the communication providers in a unified manner (that is, frequencies are assigned to communication providers in all cells in a unified manner).

The cells represented by "contract" are cells managed by a communication provider with which the user has made a contract (hereinafter, referred to as "contract cell"). Meanwhile, the cells represented by "another" are cells managed by communication providers (that is, another communication provider, hereinafter, referred to as "non-contract cell"). In this example, identical frequencies are assigned to the communication providers in all cells. Specifically, the frequencies are assigned as follows.

In an area A, cells sc11 and sc12 are contract cells for frequencies f1 and f2. On the other hand, the cells sc11 and sc12 are non-contract cells for frequencies f3 and f4.

In addition, in an area B, cells sc21 and sc22 are contract cells for the frequencies f1 and f2. On the other hand, the cells sc21 and sc22 are non-contract cells for the frequencies f3 and f4.

Further, in an area C, cells sc31 and sc32 are contract cells for the frequencies f1 and f2. On the other hand, the cells sc31 and sc32 are non-contract cells for the frequencies f3 and f4.

The problems will not occur, if individual frequencies are assigned to the providers, respectively, and the frequencies are allocated to adjacent cells in a unified manner in the unit of frequency as shown in FIG. 10. This is because the location registration is not requested to another non-contract provider, even if the mobile communication terminal is located in the cell sc12 at the frequency f2 in the area A, then moves from the area A and passes through the area B, and finally reaches the cell sc31 for the frequency f2 in the area C.

Meanwhile, FIG. 11 shows an example of another frequency cancellation process when the frequencies are not assigned to the communication providers in a unified manner (that is, a specific frequency is assigned to different communication providers in areas). In this example, a specific frequency is assigned to different communication providers in some areas. Specifically, the frequencies are assigned as follows.

In the area A, the cells sc11 and sc12 are contract cells for the frequencies f1, f2, and f3. On the other hand, the cells sc11 and sc12 are non-contract cells for the frequency f4.

In the area B, the cells sc21 and sc22 are contract cells for the frequencies f1 and f2. On the other hand, the cells sc21 and sc22 are non-contract cells for the frequencies f3 and f4.

In the area C, the cells sc31 and sc32 are contract cells for the frequencies f1, f2, and f3. On the other hand, the cells sc31 and sc32 are non-contract cells for the frequency f4.

As shown in FIG. 11, in a case where the frequencies are assigned in a unified manner, the frequency cancellation process initiates in the area B if the mobile communication terminal is located in the cell sc12 at the frequency f3 in the area A, then moves from the area A and passes through the area B, and finally reaches the area C. The frequency cancellation process is continuously performed in some cases, after the movement to the area C. This causes a problem that the frequency is rejected in the area C even though it is connectable at the frequency f3.

Japanese Patent Application No. 2002-27522 merely describes a technique for selecting cells with large ranges and small ranges and cannot solve the problems.

SUMMARY OF THE INVENTION

The present invention has been made in view of the above problems, and provides a mobile communication system, a mobile communication terminal for use in the mobile communication system, and a mobile communication control method, whereby a frequency is canceled in an effective manner.

According to a first aspect of the present invention, there is provided a mobile communication terminal that rejects a frequency in a mobile communication system with a plurality of radio cells, the mobile communication terminal comprising: storage means (for example, corresponds to a RAM 12 of FIG. 4) for storing a cancellation list indicating a frequency to be subject to a frequency cancellation process in relation to a specific frequency; frequency cancellation time setting means (for example, corresponds to step S1 of FIG. 7) for setting a frequency cancellation time based on the cancellation list stored in the storage means; and frequency rejecting means (for example, corresponds to step S2 of FIG. 7) for executing the frequency cancellation process based on the cancellation list stored in the storage means and the frequency cancellation time set in the frequency cancellation time setting means. In this way, an unnecessary location registration process is not executed, thereby reducing the power consumption, the consumption of a battery serving as a power source of the mobile communication terminal, and the consumption of the network resources. An unnecessary out-of-range time can also be reduced by optimizing the frequency cancellation time.

In the above mobile communication terminal, the frequency cancellation time setting means may refer to the cancellation list to set the frequency cancellation time, in a case where a frequency us assigned to a communication provider in a unified manner, to a value shorter than another case where the frequency is assigned in a unified manner. The consumption of the network resources can be reduced by optimizing the frequency cancellation time.

According to a second aspect of the present invention, there is provided a mobile communication control method for rejecting a frequency in a mobile communication system with a plurality of radio cells, the mobile communication control method comprising:

a frequency cancellation time setting step (for example, corresponds to step S1 of FIG. 7) of setting a frequency cancellation time based on a cancellation list indicating a frequency to be subject to a frequency cancellation process in relation to a specific frequency; and a frequency rejecting step (for example, corresponds to step S2 of FIG. 7) of executing the frequency cancellation process based on the cancellation list and the frequency cancellation time set in the frequency cancellation time setting step.

According to the above method, an unnecessary band search or the like is not performed, thereby reducing the power consumption and the consumption of a battery serving as a power source of the mobile communication terminal. The consumption of the network resources can also be reduced by optimizing the frequency cancellation time.

According to an aspect of the present invention, an unnecessary band search is not performed, thereby reducing the power consumption and the consumption of a battery serving as a power source of the mobile communication terminal. The consumption of the network resources can also be reduced by optimizing the frequency cancellation time.

DETAILED DESCRIPTION OF THE PREFERRED EMBODIMENTS

Figure 1:
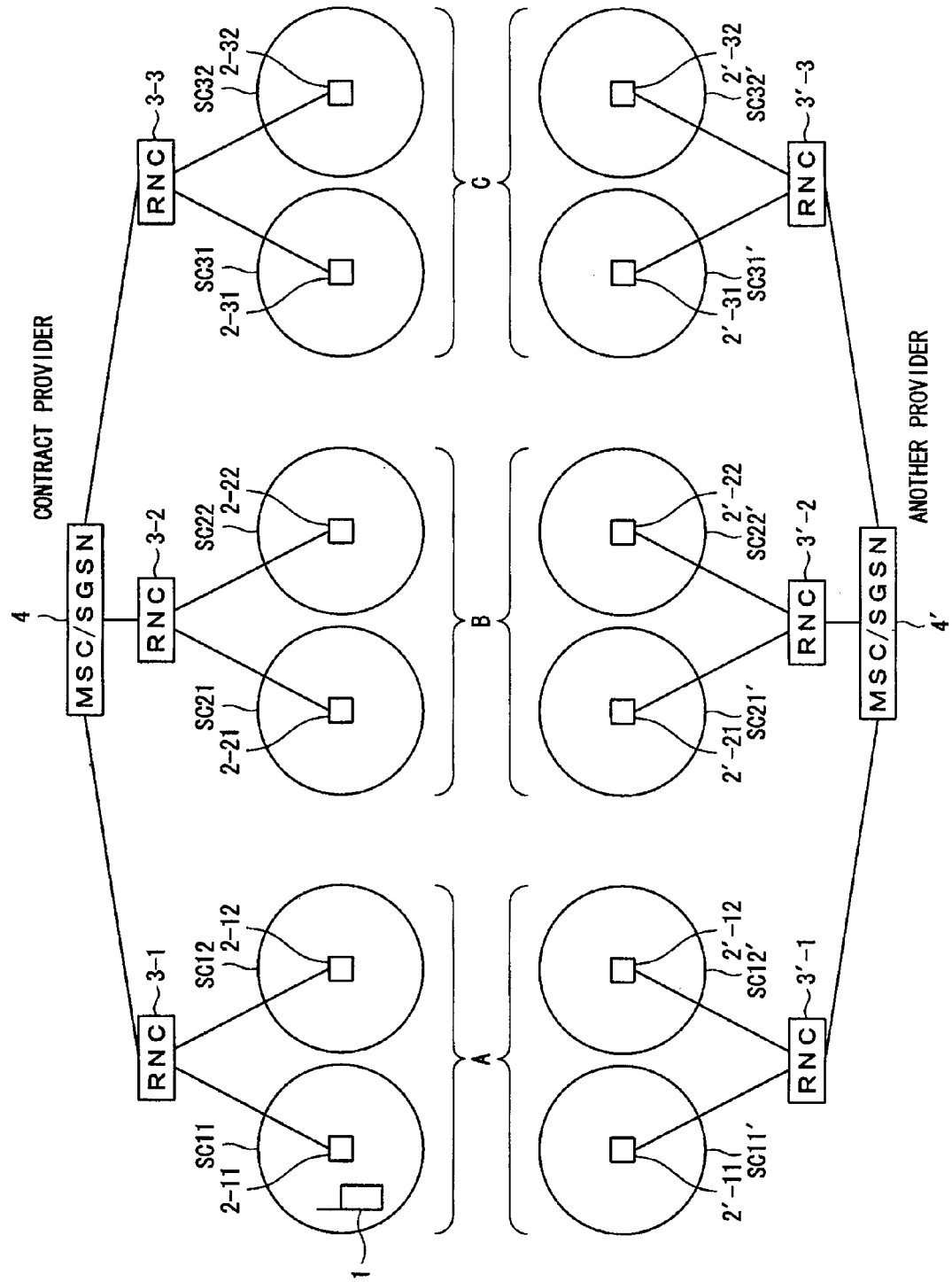
FIG. 1 illustrates a configuration of a mobile communication system according to an embodiment of the present invention.

An embodiment of the present invention will now be described with reference to the drawings. In the drawings referenced in the description, the like components in other drawings are designated with the same reference numerals.
(Summary of Frequency Rejection Process by Mobile Communication System)

In a mobile communication system according to an embodiment of the present invention, a mobile communication terminal manages a cancellation list (information indicating frequencies that cannot be connected) for rejecting a frequency to prevent an unnecessary PLMN selection, cell selection, or location registration. In this way, the location registration on a specific PLMN can be prevented. Therefore, the battery consumption of the mobile communication terminal can be reduced, and the consumption of network resources can be reduced.

The mobile communication terminal also manages a frequency cancellation time in the unit of frequency. For example, a long frequency cancellation time is set for a frequency that is assigned to the communication providers in a unified manner, whereas a shorter frequency cancellation time is set for a frequency that is not assigned in a unified manner. In this way, a suitable value of the frequency cancellation time can be set for each of the communication providers, so that an unnecessary out-of-range time can be reduced for the mobile communication terminal.
(Configuration Example of Entire Mobile Communication System)

FIG. 1 illustrates a configuration of a mobile communication system to which the present invention is applicable. In an area A of FIG. 1, there are radio cells SC11 and SC12 of a communication provider (hereinafter, referred to as "contract provider") with which the user of a mobile communication terminal 1 has made a contract. The radio cells SC11 and SC12 include radio waves transmitted by radio base transceiver stations 2-11 and 2-12, respectively.

There are radio cells SC21 and SC22 of a contract provider in an area B. The radio cells SC21 and SC22 include radio waves transmitted by radio base transceiver stations 2-21 and 2-22, respectively.

There are radio cells SC31 and SC32 of the contract provider in an area C. The radio cells SC31 and SC32 include radio waves transmitted by radio base transceiver stations 2-31 and 2-32, respectively.

A Radio Network Controller (RNC) 3-1 controls the radio base transceiver stations 2-11 and 2-12. An RNC 3-2 controls the radio base transceiver stations 2-21 and 2-22. An RNC 3-3 controls the radio base transceiver stations 2-31 and 2-32. The RNCs 3-1 to 3-3 are connected to a Mobile Services Switching Center (MSC) or Serving GPRS Support Node (SGSN) 4 ("MSC/SGSN 4" in FIG. 1), which controls connections of calls.

There are also radio cells of communication providers (hereinafter, referred to as "another provider") with which the user of the mobile communication terminal 1 has not made a contract in the same areas as the radio cells of the aforementioned contract provider. Specifically, there are radio cells SC11' and SC12' of another provider or other providers in the area A. The radio cells SC11' and SC12, includes radio waves transmitted by radio base transceiver stations 2'-11 and 2'-12, respectively.

There are radio cells SC21' and SC22' of another provider or other providers in the area B. The radio cells SC21' and SC22, includes radio waves transmitted by radio base transceiver stations 2'-21 and 2'-22, respectively.

There are radio cells SC31' and SC32' of another provider or other providers in the area C. The radio cells SC31' and SC32' includes radio waves transmitted by radio base transceiver stations 2'-31 and 2'-32, respectively.

An RNC 3'-1 controls the radio base transceiver stations 2'-11 and 2'-12. An RNC 3'-2 controls the radio base transceiver stations 2'-21 and 2'-22. An RNC 3'-3 controls the radio base transceiver stations 2'-31 and 2'-32. The RNCs 3'-1 to 3'-3 are connected to an MSC/SGSN 4', so the MSC/SGSN 4' controls connections of calls.

The mobile communication terminal 1 is capable of receiving mobile communication services when its location is registered in any of the radio cells.
(Frequency Rejection and Setting Example of Frequency Rejection Time)

A setting example of the frequency cancellation time will be described with reference to FIG. 2 and FIG. 3.

Figure 2:
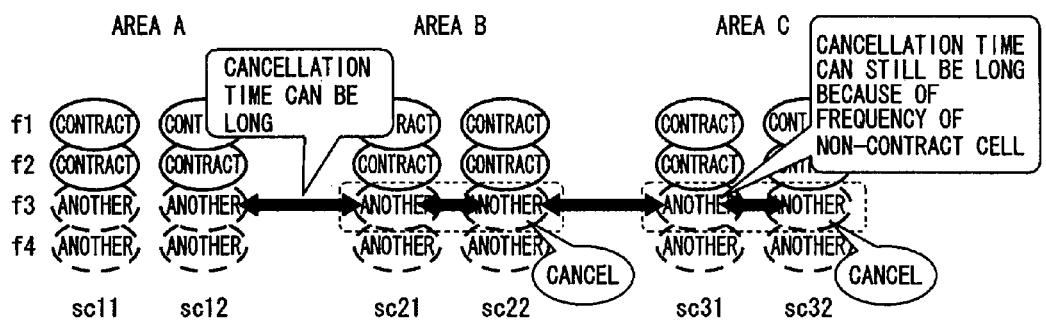
FIG. 2 shows an example of a frequency cancellation process in the mobile communication system according to an embodiment of the present invention, in a case where frequencies are allocated in a unified manner.
Figure 10:
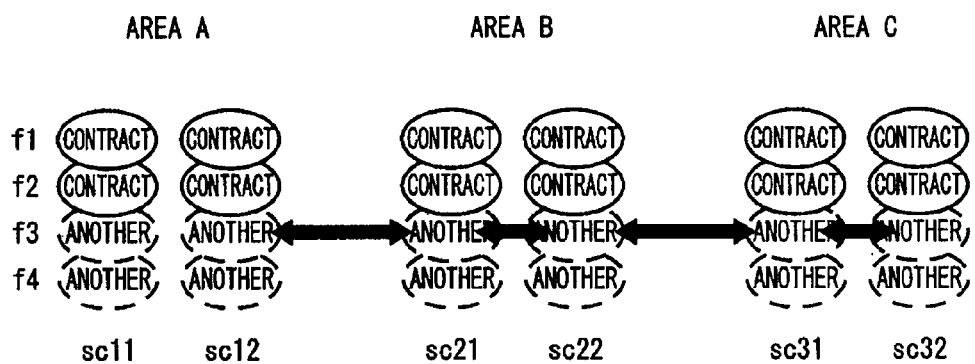
FIG. 10 shows an example of a conventional frequency cancellation process in a case where frequencies are assigned in a unified manner.

FIG. 2 shows an example of a process of the mobile communication system according to an embodiment of the present invention. FIG. 2 shows an example of contents of a frequency cancellation process in a case where frequencies are assigned in a unified manner (that is, frequencies are assigned to all cells in a unified manner), as with the case shown in FIG. 10.

Referring to FIG. 2, there is no problem in setting the cancellation time long in a case where frequencies are assigned in a unified manner. This is because the frequency to be subject to the frequency cancellation process is executed is identical in any area. In more details, attention is focused on a case where the frequency f3 is detected. The frequency is being rejected for a frequency cancellation time if the cell is provided by another provider as a result of receiving the notice information about the cell of the frequency f3. When the mobile communication terminal moves from the area A, then passes through the area B, and finally reaches the area C, the cancellation time can still be set long. This is because the cells are non-contract cells in any area in the frequency f3. To put in other words, the frequency is rejected in the cell represented by "another" surrounded by a broken line in FIG. 2 in both areas B and C after the movement.

Figure 3:
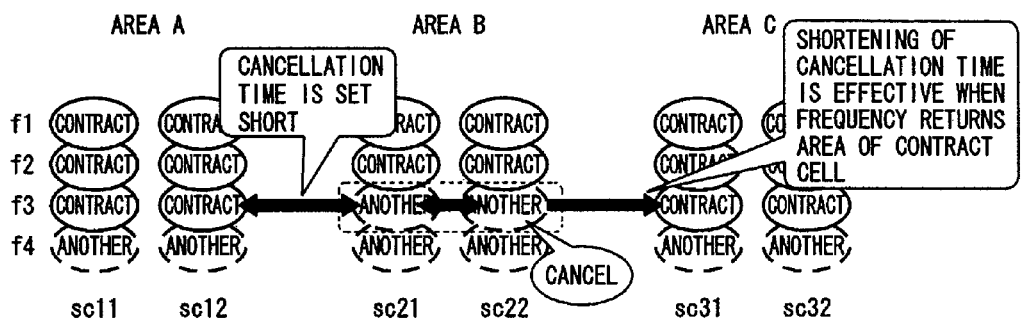
FIG. 3 shows an example of a frequency cancellation process in the mobile communication system according to an embodiment of the present invention, in a case where the frequencies are not allocated in a unified manner.
Figure 11:
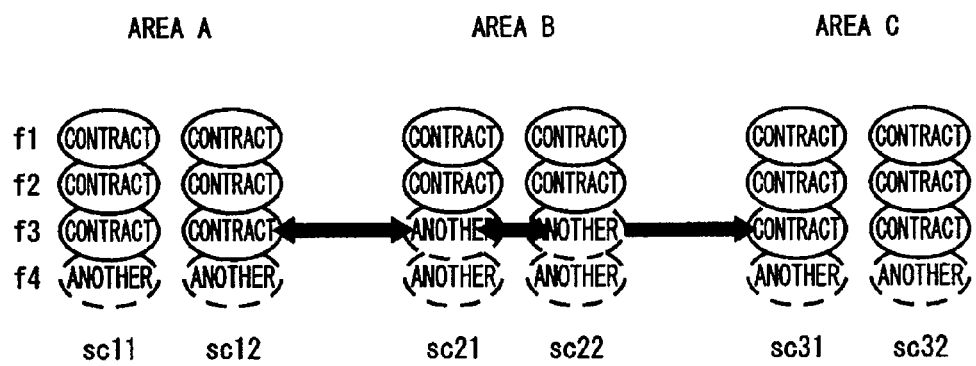
FIG. 11 shows an example of a conventional frequency cancellation process in a case where frequencies are not assigned in a unified manner.

Meanwhile, FIG. 3 shows an example of a frequency cancellation process in a case where frequencies are not assigned in a unified manner (that is, the frequencies are assigned to different communication providers, in some cells) as with the case shown in FIG. 11. Referring to FIG. 3, different frequencies are assigned to communication providers in some cells.

As shown in FIG. 3, the frequency cancellation time is set shorter than that of FIG. 2, in a case where frequencies are not assigned in a unified manner. When the mobile communication terminal is located in the area A of the frequency f3 and moves from the area A to the area B, the frequency is rejected, without a location registration, in the cell represented by "another" surrounded by a broken line in FIG. 3. When the mobile communication terminal further moves to the area C, the frequency cancellation process initiated in the area B immediately terminates (frequency cancellation stops). This is because a short frequency cancellation time has been set. To put in other words, the frequency cancellation time expires and the frequency cancellation terminates, when the mobile communication terminal moves from the area B to the area C. It is connectable in the area C of the frequency f3, so the location registration can be initiated. In this way, setting of the cancellation time short is effective when the mobile communication terminal moves from a non-contract cell to a contract cell.

(Configuration Example of Mobile Communication Terminal)

Figures 4, 5:
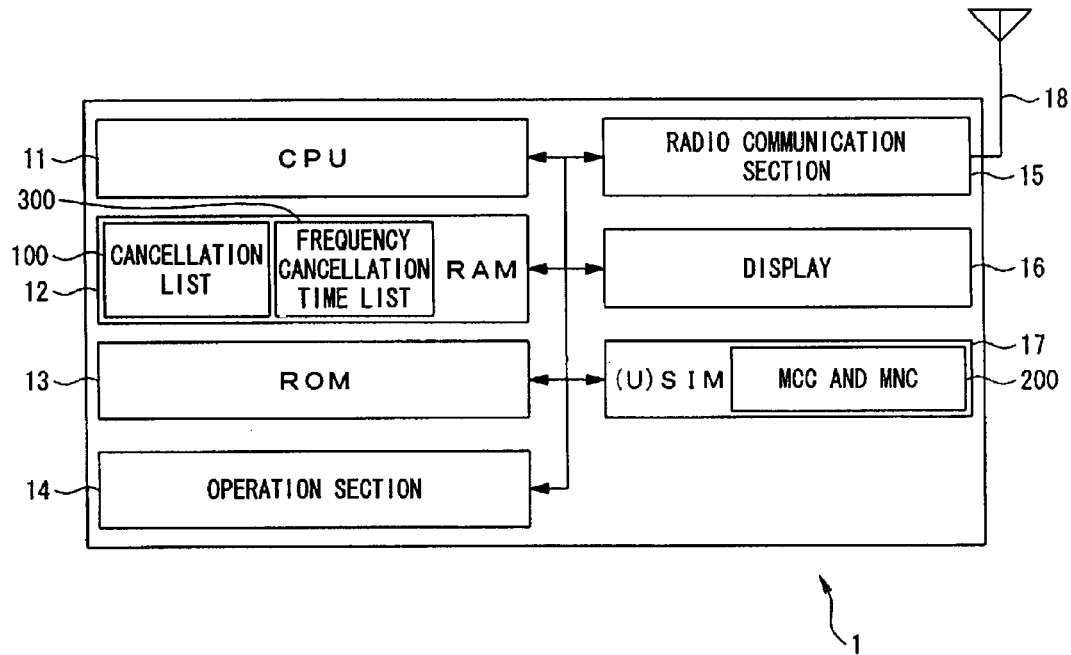
FIG. 4 is a block diagram of a configuration example of a mobile communication terminal.
FIG. 5 shows an example of a cancellation list.

FIG. 4 is a block diagram of a configuration example of the mobile communication terminal. In FIG. 4, the mobile communication terminal 1 according to the present example comprises a Central Processing Unit (CPU) 11 that controls the components in the terminal, a Random Access Memory (RAM) 12 serving as a volatile storage area, a Read Only Memory (ROM) 13 serving as a non-volatile storage area, an operation section 14 operated by the user, a radio communication section 15 that executes processes related to the radio communication, a display 16 that displays various information, a (Universal) Subscriber Identity Module ((U)SIM) 17 that stores information related to the user of the terminal, and an antenna 18 that transmits/receives radio waves.

The (U)SIM 17 is attachable to a socket (not shown) arranged in the mobile communication terminal 1. The (U)SIM 17 stores Mobile Country Code (MCC) and Mobile Network Code (MNC) 200 for identifying a communication provider with which the user of terminal 1 has made a contract.

The RAM 12 stores a cancellation list 100 and a frequency cancellation time list 300. The cancellation list 100 is information related to network identification and frequency identification that cannot be connected on radio. In other words, the cancellation list 100 is a list indicating a frequency band to be subject to a frequency cancellation process for ignoring, instead of executing, the location registration process in the frequency cancellation time. The frequency cancellation time list 300 is information related to the cancellation time of each frequency. The cancellation list 100 and the frequency cancellation time list 300 may be stored beforehand in the RAM 12 at the time of shipment of the terminal, or may be acquired from a predetermined server through the network after the shipment. The contents of the lists may be updated based on data acquired from a predetermined server through the network.

The location registration of the mobile communication terminal is performed for a radio wave in which the network identification included in the cancellation list 100 matches the MCC and MNC 200 stored in the (U)SIM 17, but the location registration is performed for a cell of the network identification included in the cancellation list 100.

When the frequency cancellation occurs, the mobile communication terminal rejects the frequency band, based on the frequency cancellation time of frequency stored in the frequency cancellation time list 300.

(Example of Rejection List)

FIG. 5 shows an example of the cancellation list. In FIG. 5, the cancellation list 100 of the present example includes network identification information for identifying a network and frequency identification information for identifying a frequency. The network identification information includes the country number and communication provider number, and is information such as "440/55" and "440/99." The Frequency Identifier (FID) is a value for identifying the frequency and is information such as "35," "66," and "68."

In the present embodiment, the frequency corresponding to the network identifier (country number and communication provider number) shown in FIG. 5 is subject to the frequency cancellation process.

(Example of Frequency Rejection Time List)

Figures 6, 7:
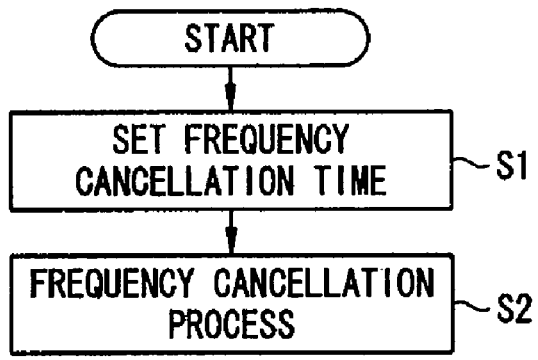
FIG. 6 is a sequence diagram of an example of a frequency cancellation list.
FIG. 7 is a flow chart of a process of the mobile communication system according to an embodiment of the present invention.

FIG. 6 shows an example of the frequency cancellation time list. In FIG. 6, the frequency cancellation time list 300 according to an aspect of the present invention includes frequency identifier for identifying a frequency and a frequency cancellation time for identifying a frequency cancellation time. The FID is a value for identifying the frequency, and includes information such as "35," "66," and "68." The frequency cancellation time is a value for setting the cancellation time and is information such as "20 min" and "30 min."

In the frequency cancellation process according to the present embodiment, the frequency is being rejected during the frequency cancellation time set based on the frequency cancellation time for each frequency band identified by the FID shown in FIG. 6. In this case, the frequency cancellation time is firstly set as shown in FIG. 7 (step S1). The frequency cancellation time is set based on the FID as described with reference to FIG. 6. The frequency cancellation process is then executed (step S2).

(Frequency Rejection Process)

The frequency cancellation process will be described with reference to FIG. 8.

Figure 8:
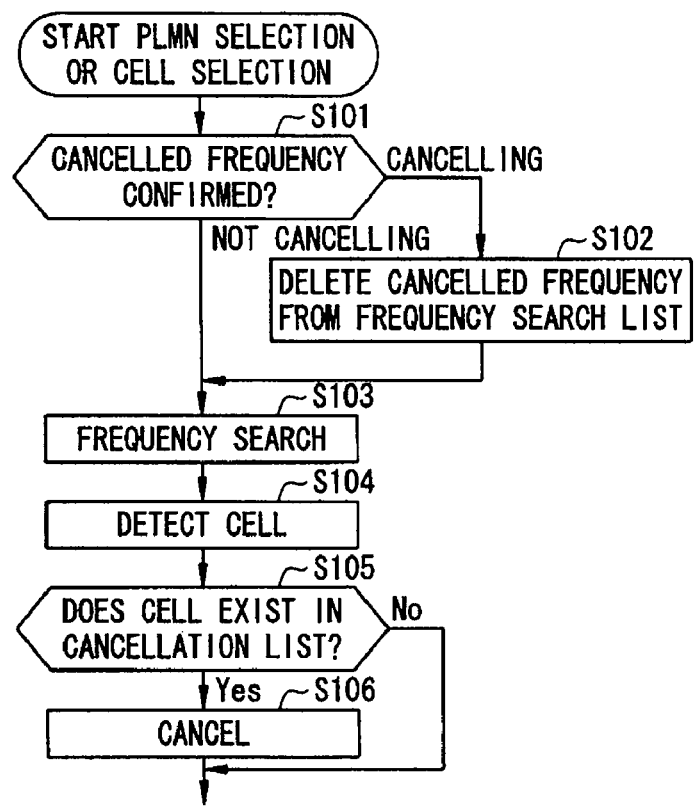
FIG. 8 is a flow chart of an example of the frequency cancellation process executed in the mobile communication terminal.

FIG. 8 is a flow chart of an example of the frequency cancellation process executed in the mobile communication terminal. In FIG. 8, if the mobile communication terminal has to perform a PLMN selection or cell selection, whether or not there is a rejected frequency at present is checked (step S101). If the frequency is being rejecting in the cell, the cell is not subject to the PLMN selection and the cell selection any longer (step S102). As a result, the mobile communication terminal does not have to perform an unnecessary frequency search. The mobile communication terminal then searches for a frequency that is not cancelled (step S103). If a cell is detected as a result of the frequency search, the mobile communication terminal receives notice information and determines whether or not the cell is included in the cancellation list (step S105). If the detected cell is in the cancellation list as a result of the determination (step S105: Yes), the frequency cancellation process is executed for the frequency (step S106). Conversely, if the detected cell is not included in the cancellation list as a result of the determination of step S105, the cancellation process is not executed for the cell (step S105: No).

(Frequency Cancellation Terminating Process)

The frequency cancellation terminating process will be described with reference to FIG. 9.

Figure 9:
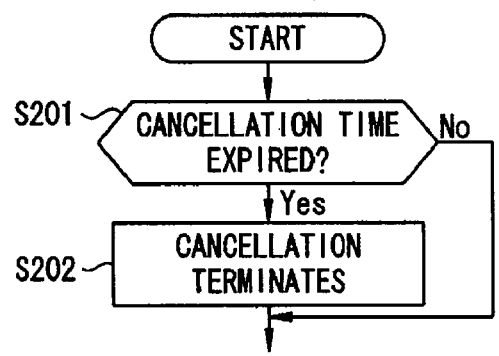
FIG. 9 is a flow chart of an example of a frequency cancellation terminating process executed in the mobile communication terminal.

FIG. 9 is a flow chart of an example of the frequency cancellation terminating process executed in the mobile communication terminal. In FIG. 9, if the set cancellation time expires while the frequency cancellation process is being executed in the mobile communication terminal (step S201: Yes), the operation state of the frequency cancellation process terminates (step S202). Conversely, if the result of the determination at step S201 shows that the set cancellation time has not expired (step S201: No), the operation state of the frequency cancellation process continues.

(Mobile Communication Control Method)

The following mobile communication control method is employed in the mobile communication terminal to be described below. The mobile communication control method is provided for rejecting a frequency in a mobile communication system realized by a plurality of radio cells, the mobile communication control method comprising: a frequency cancellation time setting step (for example, step S1 of FIG. 7) of setting a frequency cancellation time based on a cancellation list indicating frequencies subject to a frequency cancellation process in relation to specific frequencies; and a frequency rejecting step (for example, step S2 of FIG. 7) of executing the frequency cancellation process based on the cancellation list and the frequency cancellation time set in the frequency cancellation time setting step. According to the above method, an unnecessary location registration is not performed, thereby reducing the power consumption, the consumption of a battery serving as a power source of the mobile communication terminal, and the consumption of the network resources. An unnecessary out-of-range time can also be reduced by optimizing the frequency cancellation time.

CONCLUSION

As described heretofore, in the present mobile communication system, the mobile communication terminal holds the frequency cancellation list that is information related to cells that cannot be connected on radio, and controls whether or not a cell should be searched for according to the content of the cancellation list. Since an unnecessary location registration is not executed, the power consumption can be reduced, the consumption of a battery as a power source of the mobile communication terminal can be reduced, and the consumption of the network resources can be reduced. An unnecessary out-of-range time can also be reduced by optimizing the frequency cancellation time.

The present invention is applicable to a frequency cancellation process in a mobile communication system.

What is claimed is:

1. A mobile communication terminal that rejects a frequency in a mobile communication system with a plurality of radio cells, the mobile communication terminal comprising:

storage means for storing a cancellation list indicating a frequency to be subject to a frequency cancellation process in relation to a specific frequency;

frequency cancellation time setting means for setting a frequency cancellation time based on the cancellation list stored in the storage means; and frequency rejecting means for executing the frequency cancellation process based on the cancellation list stored in the storage means and the frequency cancellation time set in the frequency cancellation time setting means.

2. A mobile communication control method for rejecting a frequency in a mobile communication system with a plurality of radio cells, the mobile communication control method comprising:

setting a frequency cancellation time based on a cancellation list indicating a frequency subject to a frequency cancellation process in relation to a specific frequency; and executing the frequency cancellation process based on the cancellation list and the frequency cancellation time set in the setting step;

wherein in the frequency cancellation time setting step, the cancellation list is referred to to set the frequency cancellation time, in a case where a frequency is not assigned to a communication provider in a unified manner, to a value shorter than that in another case where the frequency is assigned to a communication provider in a unified manner.

* * * * *